March 13, 1962  E. L. ECKFELDT ET AL  3,025,458

CONDUCTIVITY CELLS

Filed April 7, 1959

United States Patent Office 3,025,458
Patented Mar. 13, 1962

3,025,458
CONDUCTIVITY CELLS
Edgar L. Eckfeldt, Ambler, and Eugene R. Kuczynski, Philadelphia, Pa., assignors to Leeds and Northrup Company, Philadelphia, Pa., a corporation of Pennsylvania
Filed Apr. 7, 1959, Ser. No. 804,766
11 Claims. (Cl. 324—30)

This invention relates to conductivity cells and has for an object the provision of structure for making the cells reliable in operation with a predetermined cell constant, such cells being useful for reproducible determination of the conductivity of liquids of widely differing character.

The present application is a continuation-in-part of our application, Serial No. 569,066, filed March 2, 1956, now United States Patent No. 2,888,640. In our said parent application we disclosed a conductivity cell comprising a molded body with a pair of conductors embedded in the body. The conductors extend outwardly from one end of the molded body to provide for electrical connection from the electrodes to be in contact with the liquid to the measuring circuit. The conductivity cells of our aforesaid application had cell constants respectively of 25 reciprocal centimeters and 50 reciprocal centimeters. While other and different cell constants may be obtained in accordance with the design of our said parent application by suitably changing the diameter and length of the flow passages, there arise additional considerations disadvantageous when dimensions alone are changed in our aforesaid cell, particularly when the cell constant is to be reduced to a much lower order, for example, to 1 reciprocal centimeter. Nevertheless, the associated measuring equipment and the associated piping needed for flow of liquid through the cell will be substantially the same for conductivity cells of widely differing cell constants, as for example, from 0.002 reciprocal centimeter to 50 reciprocal centimeters. Accordingly, it is highly advantageous that the conductivity cell of the present invention, insofar as the electrical circuits and attachment to other structural members are concerned, be interchangeable with conductivity cells having other and different cell constants.

In carrying out the present invention in one form thereof, there is provided a conductivity cell having a cell constant of the order of one reciprocal centimeter, the cell being characterized by the provision of three washer-shaped electrodes which may comprise platinum, platinum-coated, or other suitable electrode material. The inner peripheries of the washer-like elements are supported within an electrical insulating supporting structure. The two outermost elements each includes an extension mechanically engaging and electrically connected to one of a pair of embedded conductors. An intermediate disc has a like extension mechanically engaging and electrically connected to the other of the embedded conductors. The insulating supporting structure in regions between the discs is of larger diameter than in regions immediately adjacent the discs. A removable guard tube of electrical insulating material, open at the bottom and with openings near the upper portion, contributes to the establishment of the cell constant and uniform conditions of measurement with respect to the resistance paths between the electrodes.

For further objects and advantages of the invention, reference is to be had to the following detailed description taken in conjunction with the accompanying drawings, in which.

Figure 1:
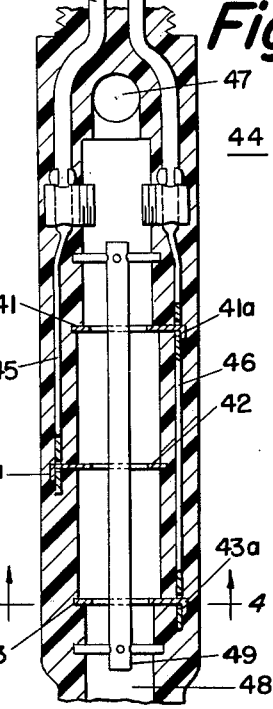
FIG. 1 is a sectional view of one embodiment of the invention.

Referring to FIG. 1, the conductivity cell 10 comprises a body 11 of insulating material having a transverse passage 12 extending through the upper end thereof. While a molded construction is shown, the body may be constructed using machined parts with suitable gaskets and holding means. Electrical conductors 13 and 14 protrude above the upper end of the body 11 to form pin-like connectors for the measuring circuit to be used in conjunction with the cell 10. One of said pin-like connectors 13 connects with a clip 15 fastened to its associated conductor 16, as does the other conductor 17 which, through a similar clip, completes the connection to conductor 14. In the region of the transverse passage 12 the conductors 13 and 14 are bent outwardly and around that passage and extend downwardly of the body 11 terminating at a region somewhat below the lowermost one of three electrodes 21, 22 and 23.

Figure 2:
FIG. 2 is an isometric view of one of the electrodes.

As shown for the electrode 21 in FIG. 2, each of electrodes 21–23 comprises a thin, flat, washer-shaped member having a connecting arm or extension 21a bent outwardly therefrom with an in-turned end 21c including a conductor-receiving elongated hole or recess 21b. As shown in FIG. 2 (as well as by the dimensions later set forth), it will be seen that the radial dimension of each electrode is large compared with its thickness. The terminal portion of the in-turned end 21c is bent upwardly to form a tab 21d. This tab is soldered or welded to the conductor 13. Thus, each of electrodes 21 and 23 mechanically engages and is electrically connected to the conductor 13, while the electrode 22 through its connecting arm 22a mechanically engages and is electrically connected to the conductor 14.

The upper end of the body 11 has a sealing groove for an O ring 25 which provides a liquid-tight seal between the member 11 and a protective cap 26. The body 11 is provided with a threaded portion 27 for receiving a guard-tube 28 which is positioned at its lower end by a series of spaced vanes or guides 11b. As shown in FIG. 1, for use as a dip cell the tube 28 is provided with a series of openings 30 located adjacent its upper end to assure complete filling of the tube and uniformity in the amount of liquid under measurement within and adjacent the electrodes 21–23.

The electrodes 21–23 are preferably of a conductive material, such as platinum, carbon or graphite, and selected because of inertness with respect to the solution under measurement and suited to the electrochemical properties needed for the conductivity measurement. When they are made of platinum they are preferably coated with platinum black to improve their electrochemical performance. The conductors 13 and 14 may be of lower cost suitable electrical conductive material, since these conductors are entirely embedded in the body 11 and thus protected from attack by the liquid under measurement.

The washer-shaped electrodes 21–23 in the cell illustrated are respectively spaced one from the other 0.904 inch. Each disc has a diameter of 0.594 inch. The diameter of the molded body 11 in the region immediately adjacent each disc is 0.438 inch, and the regions intermediate discs 22 and 23 and 22 and 21 have diameters of 0.507 inch.

The regions of the changing cross-sectional area are connected by chamfers of 45°, and the distance from each electrode to the region of increased cross-sectional area of body 11 is 0.131 inch. The housing or protective cover 28 has an internal diameter of 0.687 inch. A cell incorporating the above features and of the stated dimensions has a cell constant of one reciprocal centimeter. The combination of a shorter diameter in the regions of the electrodes and a larger diameter of the material between the electrodes results in improved constancy in the cell constant characteristic over a range of solution resistivities. Conductivity cells embodying the above features have been found to be reliable in use and capable of achieving a high degree of reproducibility of measurements.

The body 11 and the protective cover 28 are preferably made of a dimensionally stable, chemically inert, electrical insulating material such as the synthetic resin trifluorochloroethylene available on the market under the trademark "Kel-F," though it is to be understood that other synthetic resins may be utilized. Either a "Teflon" resin or a "Kel-F" resin is preferred because they lend themselves to molding or sintering operations by means of which the conductors may be readily embedded therein as above described. In this connection, it is to be noted the inner peripheries of the electrodes including their projections are enclosed in, and covered by, the resin.

It is to be noted that there is shown by broken lines an extension 38 which may be threaded to receive a pipe connection for forced flow of liquid through the cell, it being understood opening 30 would then be omitted. In this connection, the lower end of the housing 28 may likewise be threaded to receive a length of pipe to complete the inclusion of the cell 10 in a fluid-circulating system, the conductivity of which fluid is to be measured. In practice, the housing 28 is made interchangeable with a flow-providing housing including the branch projection 38, an example of such a housing being shown in our companion application Serial No. 804,765, executed and filed concurrently herewith.

Figure 3:
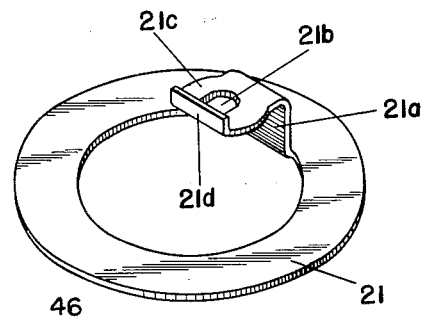
FIG. 3 is a sectional view of a further embodiment of the invention similar to the modification of FIG. 1 but with the end-portions cut away.
Figure 4:
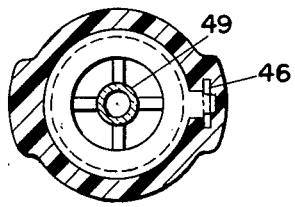
FIG. 4 is a sectional view taken on the lines 4—4 of FIG. 3.

In the modification of FIG. 1 the outer peripheral portions of the electrodes 21–23 are exposed to the solution, the conductivity of which is to be measured. In the modification of FIG. 3 the inner peripheral portions of the electrodes 41, 42 and 43 are exposed within an inner chamber of a conductivity cell 44. These electrodes 41–43 of washer-like shape have bent-over portions 41a, 42a, 43a which extend through openings in flattened portions, FIG. 4, of conductors 45 and 46. Each bent-over portion is welded or soldered to its associated conductor, the two outermost electrodes being joined to conductor 46, and the intermediate electrode 42 being joined to the conductor 45. A transverse opening 47 in conjunction with the open distal end 48 provides for ingress to and egress from the cell of the sample solution whose conductivity is to be measured. Conductivity measurements may be made of such a sample solution either by the batch method or during forced flow of the solution through the conductivity cell.

If it be desired to change the value of the cell constant, this can be done by including within the cell an insulating member 49 of uniform cross-sectional area and of length somewhat exceeding that of the spacing of the outermost electrodes 41 and 43 one from the other. The member 49 may, if desired, comprise a glass tube or rod supported by spacing members extending inwardly from the body portion of the cell. This body portion may be made of "Kel-F," "Teflon," or other synthetic resins having the desired properties referred to above.

It is to be understood that features of the embodiment of FIG. 1 may be utilized in connection with the modification of FIG. 3, and vice versa. It is further contemplated that additional modifications in the invention may be made within the spirit and scope of the appended claims.

What is claimed is:

1. A conductivity cell comprising a body of dimensionally stable, chemically inert, electrical insulating material, electrical conductors enclosed within said body and exposed at one end for the completion of electrical connections thereto, a plurality of flat, disc-shaped electrodes spaced one from the other lengthwise of said body and coaxial therewith, each said electrode having a connecting arm extending into proximity with one of said enclosed conductors and electrically joined thereto, said electrodes having their inner peripheries protruding into said body and the remainder of said disc-shaped electrodes extending radially of said body, said electrodes having a large radial dimension compared with the thickness of said electrodes, said body having a mechanical coupling portion intermediate its ends, and a protective housing engaging said mechanical coupling portion and extending lengthwise of said body to form an enclosure for all of said electrodes, said housing having a passage at its upper end and a passage at its lower end for ingress and egress of fluid to said cell, and guides extending between said body and said housing for centering the lower end of said body coaxially of said housing.

2. The conductivity cell of claim 1 in which each of the connecting arms of said electrodes has a conductor-accommodating recess for receiving therein one of said conductors.

3. The conductivity cell of claim 1 in which said conductors in said body in a region adjacent said passage are bent into opposed semi-circular shape, said passage at the upper end of the cell being intermediate said conductors.

4. The conductivity cell of claim 1 in which said body has a second mechanical coupling portion near its upper end for receiving a protective cap.

5. The conductivity cell of claim 1 in which three electrodes are used, the outer two being connected to one conductor and the intermediate one being connected to a second conductor.

6. The conductivity cell of claim 1 in which there are provided pipe connections, one to said opening and another to the end of said housing remote from said opening for flow of liquid through said cell.

7. A conductivity cell comprising a body of dimensionally stable, chemically inert, electrical insulating material, a pair of conductors embedded in said body and exposed only at the upper end of said body for electrical connection to a measuring circuit, a plurality of spaced washer-shaped electrodes coaxially disposed in spaced relation one from the other along said body, the plane of each of said electrodes being perpendicular to the longitudinal center line of said body, said electrodes having a large radial dimension compared with the thickness of said electrodes, said body in the regions between said electrodes being cylindrical and including sections of shorter and longer diameters for reducing the effective solution cross-sectional area for increasing the value of the cell constant for a given length of cell.

8. A conductivity cell comprising a body of dimensionally stable, chemically inert, electrical insulating material, electrical conductors enclosed within said body and exposed at one end for the completion of electrical connections thereto, and a plurality of electrodes of washer-like shape disposed coaxially and spaced one from the other lengthwise of said body, the two outermost electrodes having portions thereof electrically joined to one of said conductors and an intermediate electrode electrically joined to the other of said conductors, each of said conductors having a flattened portion in the region in which an electrode is joined thereto, each said electrode in that region having an extension protruding through an opening in an associated flattened conductor and bent over into face-to-face relation with said conductor, said electrodes in the regions in which joined to said conductors being enclosed within said body, each of said electrodes having annular portions thereof projecting from said body and into an interiorly located chamber into which there may be introduced a sample solution whose conductivity is to be measured, said electrodes having a large radial dimension compared with the thickness of said electrodes, said body having openings communicating with said chamber in regions respectively spaced from the outermost electrodes for ingress to and egress from said chamber of said sample solution.

9. The conductivity cell of claim 8 in which there is disposed coaxially of said electrodes an insulating member of uniform thickness and of length exceeding the spacing between the outermost electrodes for reducing within said chamber and throughout the region of said electrodes the volume of the sample solution.

10. A structure for a conductivity cell comprising a body of dimensionally stable, chemically inert, electrical insulating material, lead structure entering said body at one end and connected to electrodes supported by said body, a plurality of spaced electrodes of washer-like shape disposed relative to said body coaxially with the longitudinal centerline thereof with the plane of said electrodes perpendicular to said centerline, said electrodes having a large radial dimension compared with the thickness of said electrodes, and portions of said body extending between said discs, said portions being alternately of different diameters with the shorter diameter portions immediately adjacent said electrodes and the longer diameter portions symmetrically disposed between said electrodes, the combination of shorter and longer diameters reducing the effective solution cross-sectional area to achieve a higher cell constant for a given length of cell.

11. A conductivity cell comprising a body of dimensionally stable, chemically inert, electrical insulating material, electrical conductors enclosed within said body and exposed at one end for the completion of electrical connections thereto, a plurality of electrodes of washer-like shape disposed coaxially and spaced one from the other lengthwise of said body, the two outermost electrodes having portions thereof electrically joined to one of said conductors and an intermediate electrode electrically joined to the other of said conductors, said electrodes in the regions in which joined to said conductors being enclosed within said body, each of said electrodes having annular portions thereof projecting from said body and into an interiorly located chamber into which there may be introduced a sample solution whose conductivity is to be measured, said electrodes having a large radial dimension compared with the thickness of said electrodes, said body having openings communicating with said chamber in regions respectively spaced from the outermost electrodes for ingress to and egress from said chamber of said sample solution, and an insulating member disposed coaxially of said electrodes, said insulating member being of uniform thickness and of length exceeding the spacing between the outermost electrodes for reducing within said chamber and throughout the region of said electrodes the volume of the sample solution.

References Cited in the file of this patent

UNITED STATES PATENTS

| | | |
|---|---|---|
| 1,807,821 | Behr | June 2, 1931 |
| 2,122,363 | Christie | June 28, 1938 |
| 2,654,862 | Petersen | Oct. 6, 1953 |

FOREIGN PATENTS

| | | |
|---|---|---|
| 44,323 | Sweden | July 24, 1918 |